(12) United States Patent
Franks et al.

(10) Patent No.: US 10,642,682 B2
(45) Date of Patent: *May 5, 2020

(54) INTERACTIVE MULTI-LEVEL FAILSAFE ENABLEMENT

(71) Applicant: INTERNATIONAL BUSINESS MACHINES CORPORATION, Armonk, NY (US)

(72) Inventors: Jon K. Franks, Siler City, NC (US); Maria E. Smith, Davie, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,178

(22) Filed: May 24, 2018

(65) Prior Publication Data

US 2018/0267849 A1 Sep. 20, 2018

Related U.S. Application Data

(63) Continuation of application No. 15/012,302, filed on Feb. 1, 2016, now Pat. No. 10,031,800.

(51) Int. Cl.
*G06F 9/445* (2018.01)
*G06F 11/07* (2006.01)
(Continued)

(52) U.S. Cl.
CPC ...... *G06F 11/0793* (2013.01); *G06F 9/44536* (2013.01); *G06F 11/0706* (2013.01);
(Continued)

(58) Field of Classification Search
CPC .. G06F 11/076; G06F 11/3664; G06F 11/366; G06F 11/3668; G06F 11/3696;
(Continued)

(56) References Cited

U.S. PATENT DOCUMENTS 5,627,964 A 5/1997 Reynolds et al.
5,784,549 A 7/1998 Reynolds et al.
(Continued)

OTHER PUBLICATIONS

List of IBM Patents or Patent Applications Treated as Related; (Appendix P), Filed May 24, 2018; pp. 1-2.
(Continued)

*Primary Examiner* — Joseph O Schell
(74) *Attorney, Agent, or Firm* — Cantor Colburn LLP; Michael O'Keefe

(57) ABSTRACT

Embodiments include method, systems and computer program products for an interactive, multi-level failsafe capability. In some embodiments, a failed count indicative of a number of failed attempts to launch an application may be received. A failsafe mode level corresponding to the failed count may be determined. The failsafe mode level may be initialized in response to determining the failsafe mode level corresponding to the failed count. The failsafe mode level may determine the functionality that may be enabled. Users may perform interactive debugging by editing configuration settings and manually enabling functionality.

17 Claims, 3 Drawing Sheets

(51) Int. Cl.
*G06F 9/4401* (2018.01)
*G06F 11/36* (2006.01)
*G06F 9/30* (2018.01)
*G06F 21/62* (2013.01)

(52) U.S. Cl.
CPC .......... *G06F 11/076* (2013.01); *G06F 11/079* (2013.01); *G06F 11/0796* (2013.01); *G06F 9/30189* (2013.01); *G06F 9/445* (2013.01); *G06F 9/4406* (2013.01); *G06F 11/366* (2013.01); *G06F 11/3664* (2013.01); *G06F 21/629* (2013.01)

(58) Field of Classification Search
CPC ........ G06F 21/575; G06F 21/74; G06F 21/57; G06F 21/53; G06F 9/4406; G06F 9/30189; Y10S 707/99939
See application file for complete search history.

(56) References Cited

U.S. PATENT DOCUMENTS

| | | | | |
|---|---|---|---|---|
| 6,560,726 | B1 * | 5/2003 | Vrhel, Jr. | G06F 11/0757 713/2 |
| 6,564,371 | B1 * | 5/2003 | Goldman | G06F 11/1433 714/46 |
| 6,675,295 | B1 * | 1/2004 | Marcelais | G06F 11/1441 713/1 |
| 9,110,679 | B1 * | 8/2015 | Chan | G06F 9/4411 |
| 10,031,800 | B2 * | 7/2018 | Franks | G06F 11/0793 |
| 2004/0003222 | A1 * | 1/2004 | Rich | G06F 9/4406 713/1 |
| 2006/0075216 | A1 | 4/2006 | Vaha-Sipila et al. | |
| 2006/0236198 | A1 | 10/2006 | Lintz, Jr. et al. | |
| 2007/0157308 | A1 | 7/2007 | Bardsley et al. | |
| 2009/0307480 | A1 | 12/2009 | Katoh | |
| 2014/0223161 | A1 * | 8/2014 | Kim | G06F 9/4401 713/2 |
| 2015/0185760 | A1 | 7/2015 | Schroeder | |
| 2016/0224426 | A1 * | 8/2016 | Holden | G06F 11/1433 |
| 2016/0342477 | A1 * | 11/2016 | Swierk | G06F 11/1417 |
| 2017/0220408 | A1 | 8/2017 | Franks et al. | |

OTHER PUBLICATIONS

IBM et al., "Hardware Feature Detection and Configuration with Failsafe Checkpointing", An IP.com Prior Art Database Technical Disclosrue, 000117132, Dec. 1, 1995, pp. 1-3.

IBM et al., "Fail-Safe Error Detection with Improved Isolation of I/O Faults", An IP.com Prior Art Database Technical Disclosure, 000056265, Nov. 1, 1980, pp. 1-4.

IBM, "IBM DataPower Gateway Firmware V7.2 provides increased cloud deployment flexibility and mobile security enhancements", IBM United States Software Announcement, May 26, 2015, pp. 1-14.

* cited by examiner

INTERACTIVE MULTI-LEVEL FAILSAFE ENABLEMENT

DOMESTIC PRIORITY

This application is a continuation of U.S. application Ser. No. 15/012,302, titled "INTERACTIVE MULTI-LEVEL FAILSAFE ENABLEMENT" filed Feb. 1, 2016, the contents of which are incorporated by reference herein in its entirety.

STATEMENT REGARDING PRIOR DISCLOSURE BY THE INVENTORS

The following disclosure(s) are submitted under 35 U.S.C. § 102(b)(1)(A): DISCLOSURE: IBM DataPower Gateway Firmware V7.2 provides increased cloud deployment flexibility and mobile security enhancements, May 26, 2015.

BACKGROUND

The present disclosure relates to methods, systems and computer program products for an interactive multi-level failsafe capability.

Devices are often designed to include a failsafe mode. In critical error scenarios, the device enters this mode to prevent or minimize the harm to the device or other entity. When in failsafe mode, users have limited capabilities but are often enabled to save important data and view error messages. Users are sometimes able to correct certain type of problems if the error messages are sufficiently informative.

Failsafe mode designs can be seen in many types of products. For example, failsafe mode for traffic lights would result in the lights flashing when an error condition occurs. In the software world, a failsafe mode in an operating system may be initialized when faulty drivers are installed or when some program prevents the system from loading normally. In these types of environments, the system may enter failsafe mode, where many capabilities are disabled and users are not allowed to enable them in the failsafe mode.

SUMMARY

In accordance with an embodiment, a computer-implemented method for establishing a failsafe mode for an electronic device may be provided. The method may include receiving a failed count indicative of a number of failed attempts to launch an application from a supervisor module; determining a failsafe mode level corresponding to the failed count; and initializing the failsafe mode level in response to determining the failsafe mode level corresponding to the failed count.

In another embodiment, a computer program product for establishing a failsafe mode for an electronic device may include a non-transitory storage medium readable by a processing circuit and storing instructions for execution by the processing circuit for performing a method comprising receiving a failed count indicative of a number of failed attempts to launch an application from a supervisor module; determining a failsafe mode level corresponding to the failed count; and initializing the failsafe mode level in response to determining the failsafe mode level corresponding to the failed count.

In another embodiment, a system for establishing a failsafe mode for an electronic device may include a processing unit in communication with one or more types of memory, where the processing unit may be configured to receive a failed count indicative of a number of failed attempts to launch an application from a supervisor module; determine a failsafe mode level corresponding to the failed count; and initialize the failsafe mode level in response to determining the failsafe mode level corresponding to the failed count.

BRIEF DESCRIPTION OF THE DRAWINGS

The foregoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products with an interactive multi-level failsafe capability. This disclosure is directed to a failsafe enabling program that may be used during exercises, such as, to diagnose and correct problems through live software debugging.

In some embodiments, the interactive multi-level failsafe enabling program may have multiple failsafe levels. Each level may differ from the next in terms of enabled functionality. A failed count is maintained of the number of start-up attempts and may be used to determine the failsafe mode level that the system enters. As the number of attempts increases, the failsafe mode level increases and becomes more and more restrictive in terms of automatically enabled functionality; in other words, there may be a direct relationship between the increase in the failsafe mode level and the program automatically disabling software and/or hardware functionality. In some embodiments, users may manually enable functionality that was disabled as the system entered their specific level of failsafe mode. This capability allows users to perform live-debugging of their environment. For example, if some feature was disabled, they can examine the configuration settings for that feature and if it looks suspicious, they may enable only that feature and observe the results. If enabling the feature resulted in system failure, then the user would have identified a problem that needs to be corrected. The user could then proceed to modify the configuration and enable the feature once again.

The different failsafe mode levels may each have varying degrees of functionality. Additionally, each configuration or command of a computing system may be assigned a failsafe mode level indicating at what levels of failsafe mode initialization it can be enabled. Additionally, after failsafe model level initialization, all commands may be enabled manually.

Figure 1:
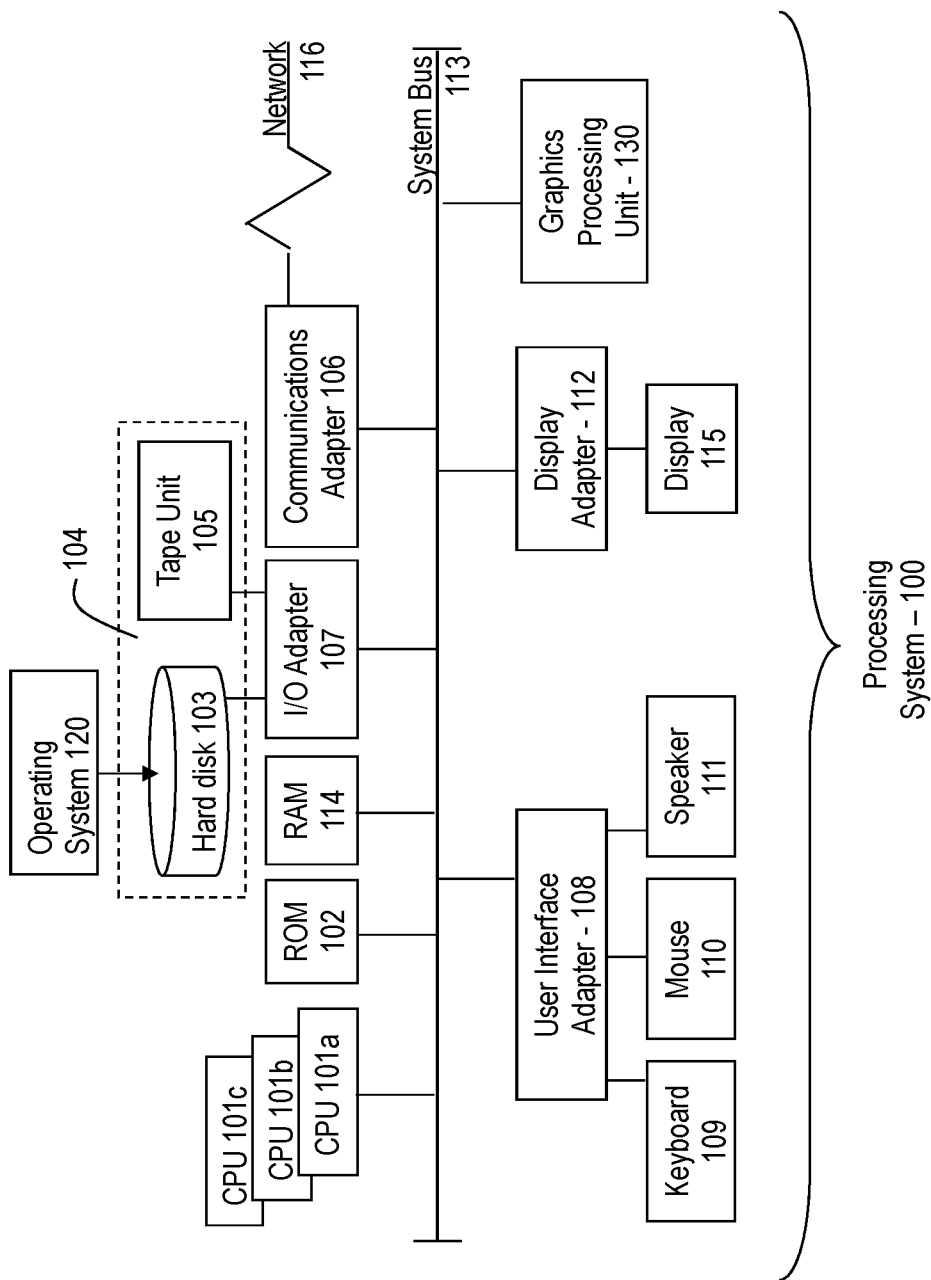
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
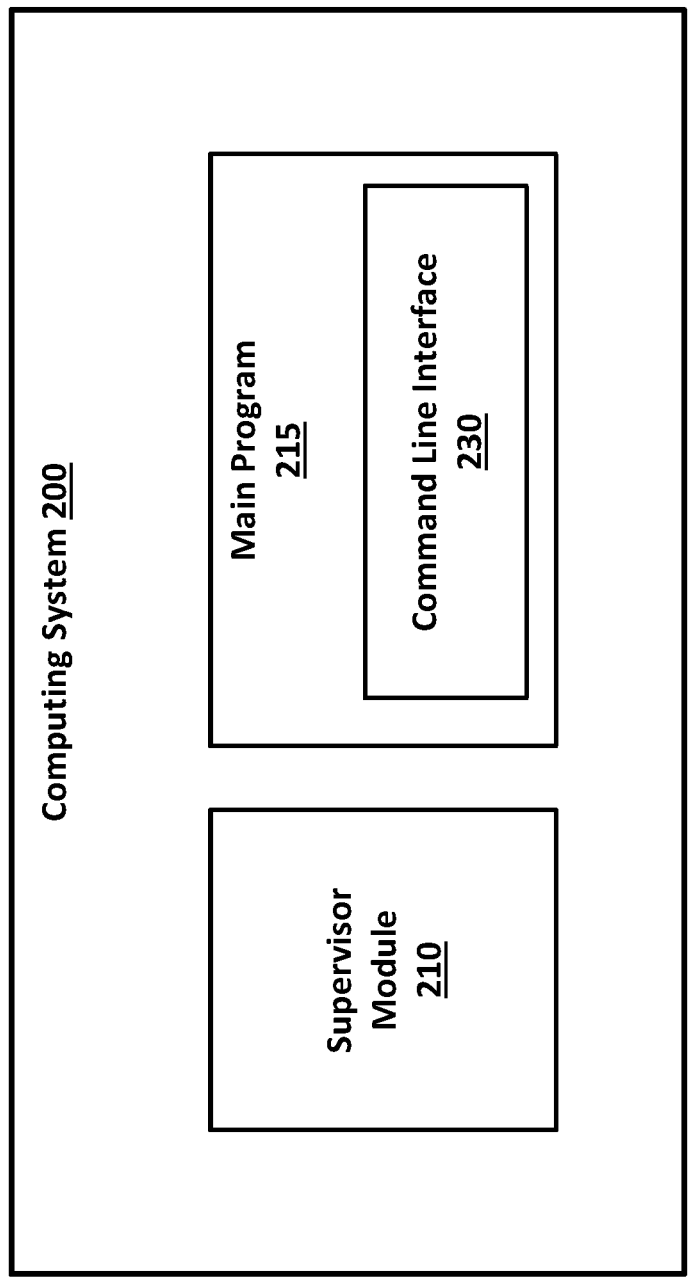
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to a supervisor module 210 and a main program 215. The main program 215 may include a command line interface 230.

The supervisor module 210 may include computer-readable instructions that, in response to execution by the processor(s) 101, cause operations to be performed including monitoring the execution and processing of one or more applications (e.g., main program 215) and tools. The supervisor module 210 may also maintain a failed count that is indicative of the number of failed attempts to launch the main program 215 and may be responsible for launching or initiating the main program 215.

The main program 215 may include computer-readable instructions that, in response to execution by the processor(s) 101, cause operations to be performed including monitoring networks connections, data processing, or the like.

The main program 215 may include computer-readable instructions that, in response to execution by the processor(s) 101, cause operations to be performed including determining a failsafe mode level to initialize based on the failed count received from the supervisor module 210. The main program 215 may enable one or more configuration, command, and/or functionality based on input received from a user. In some embodiments, the main program 215 may communicate with the supervisor module 210 to increment or reset the failed count.

The command line interface 230 may include computer-readable instructions that, in response to execution by the processor(s) 101, cause operations to be performed including generating an interface to present to the user and to receive input via the interface. In some embodiments, the command line interface may be used to issue a command to the main program 215 to reset the failed count. In some embodiment, the command line interface 230 may be used to issue a command to the main program 215 to set the failed count to a specific number. In some embodiments, the command line interface 230 may be included in the main program 215 to enable the user to activate functionality and edit settings of the main program 215 while in a failsafe mode; in other words, to enable the user to effectively override the failsafe mode.

Figure 3:
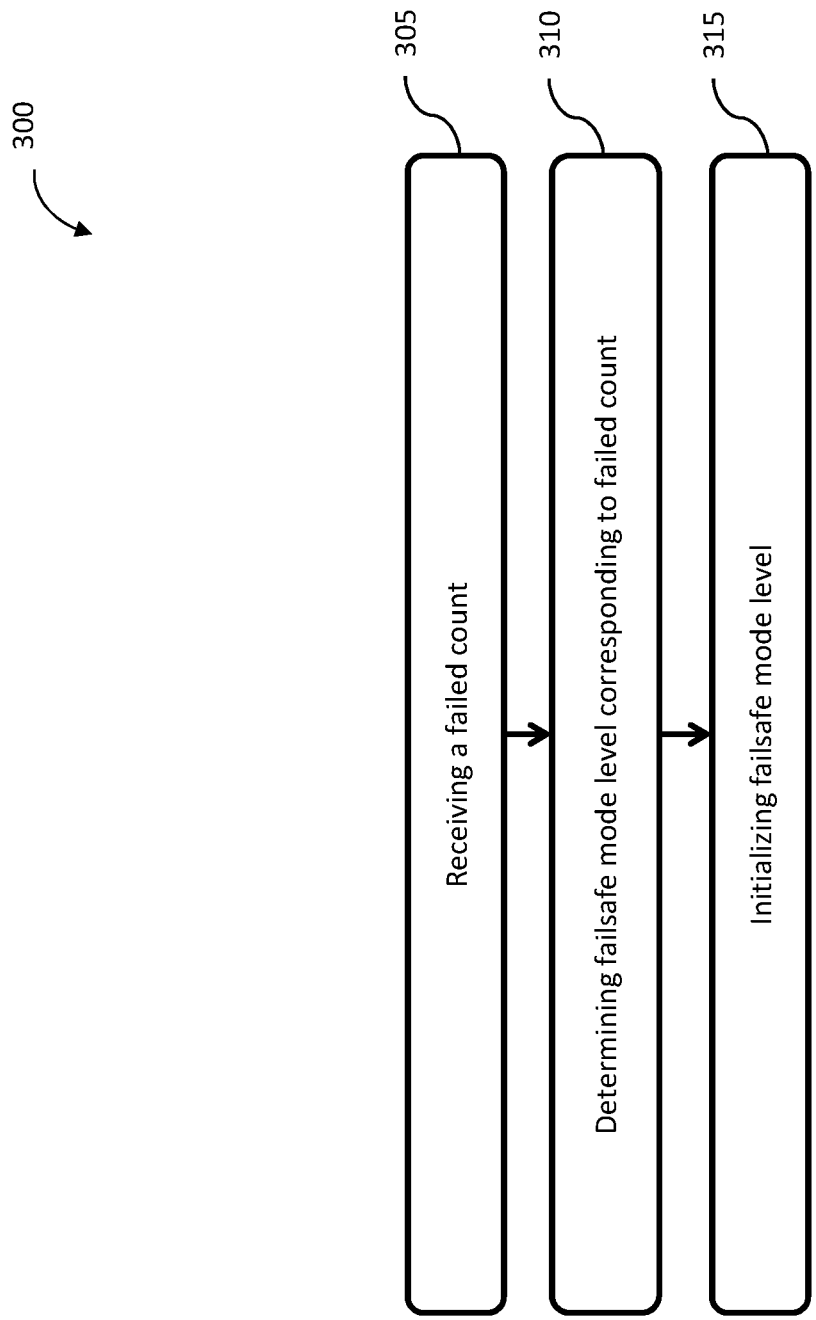
FIG. 3 is a flow diagram of a method for an interactive multi-level failsafe enabling program in accordance with an exemplary embodiment.

Referring now to FIG. 3, a flow diagram of a method 300 for an interactive multi-level capability in accordance with an exemplary embodiment is shown.

At block 305, the main program 215 may receive a failed count indicative of a number of failed attempts to launch an application (e.g., main program 215). In some embodiments, the supervisor module 210 may maintain the failed count and may transmit the failed count to the main program 215. In some embodiments, the supervisor module 210 may determine that an application has not failed in a predetermined time period. The supervisor module 210 may set the failed count to zero in response to determining that the application has not failed in the predetermined time period. In some embodiments, the supervisor module 210 may determine that the application has failed in a predetermined time period and may increment the failed count in response to determining that the application has failed in the predetermined time period. In some embodiments, the supervisor module 210 may relaunch the application after incrementing the failed count. In some embodiments, the predetermined time period may be adjusted by a user of the computing system 200. In some embodiments, a supervisor module 210 may receive a command from a user to reset the failed count. In some embodiments, the command may be received through a command line interface 230. The supervisor module 210 may reset the failed count using a value received from the user.

At block 310, the main program 215 may determine a failsafe mode level corresponding to the failed count. In some embodiments, the main program 215 may include several different levels, where each level has a different degree of enabled functionality. In some embodiments, each level may be associated with a range to compare to the failed count. For example, a first failsafe mode level may be associated with 5-10 failed attempts to launch an application, while a second failsafe model level may be associated with 11-15 failed attempts to launch an application. Continuing with this example, when 5-10 failed attempts are registered, a first portion of functionality is disabled; when 11-15 failed attempts are registered, a second, larger portion functionality is disabled. The main program 215 may determine whether the received failed count falls within a specific range associated with a level and may select the failsafe mode level accordingly. In some embodiments, the main program 215 may determine that the failed count exceeds a predetermined threshold from a plurality of predetermined thresholds and may select the failsafe mode level from a plurality of failsafe mode levels based on determining the failed count exceeds the predetermined threshold.

At block 315, the main program 215 may initialize the failsafe mode level in response to determining the failsafe mode level corresponds to the failed count. In some embodiments, the main program 215 may receive a command from a user (e.g., via a command line interface 230) to enable a disabled functionality in the failsafe mode level. The main program 215 may enable the disabled functionality in response to receiving the command from the user.

In some embodiments, the application (e.g., main program) being initiated may have two phases: initialization and normal runtime. Once initialization has completed (e.g., in a failsafe level), the main program 215 may send a command to the supervisor module 210 to decrement the failed count by 1. This way, if the user enters a command to enable some disabled functionality, and this causes a failure, the failed count sent to the main program 215 will be the same count that was originally sent before the user tried to enable a functionality. This seeks to ensure that, if, for example, while the user is troubleshooting (e.g., live debugging), that the failed count does not continue to increase, thus entering a different failsafe mode level. This can avoid the need to change the environment while the user is attempting to debug the original problem.

In some embodiments, the application may fail again, before the main program 215 has a chance to decrement the failed count. The supervisor module 210 may update the failed count and may send the updated failed count to the main program 215. In some embodiments, the main program 215 may determine, based on the updated failed count, that a different failsafe mode level should be initialized. The main program 215 may initialize the selected failsafe mode level.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for enabling a multi-level failsafe capability of an electronic device, comprising:
   determining a failed count indicative of a number of failed attempts to launch an application executing on the electronic device;
   selecting a failsafe mode level corresponding to the failed count;
   initializing the application at the failsafe mode level, wherein initializing the application at the failsafe mode level comprises launching the application with a portion of functionality of the application disabled, and
   setting the failed count to zero based on a determination that a predetermined time period has elapsed without the application failing.

2. The computer-implemented method of claim 1, further comprising:
   determining that the application has failed within a predetermined time period;
   incrementing the failed count; and
   re-launching the application.

3. The computer-implemented method of claim 1, wherein selecting the failsafe mode level corresponding to the failed count comprises:
   determining that the failed count lies within a particular predetermined threshold range of failed attempts among a plurality of predetermined threshold ranges, wherein the plurality of predetermined threshold ranges correspond to a plurality of different failsafe mode levels, respectively;
   determining that a failsafe mode level corresponds to the particular predetermined threshold range; and
   selecting the failsafe mode level among the plurality of failsafe mode levels based at least in part on determining that the failsafe mode level corresponds to the particular predetermined threshold range.

4. The computer-implemented method of claim 1, further comprising during a live-debugging of the application:
   receiving a user request to enable a portion of the disabled functionality; and
   enabling the portion of the disabled functionality.

5. The computer-implemented method of claim 4, wherein the user request is a first user request, the method further comprising:
   determining that the application has failed after the portion of the disabled functionality is enabled;
   receiving a second user request to modify configuration settings associated with the portion of the disabled functionality;
   modifying the configuration settings based at least in part on receiving the second user request; and
   re-initializing the application at the failsafe mode level.

6. The computer-implemented method of claim 1, wherein the failed count is a first failed count, the failsafe mode level is a first failsafe mode level, and the portion of functionality is a first portion of functionality, the method further comprising:
   determining a second failed count indicative of an updated number of failed attempts to launch the application;
   selecting a second failsafe mode level corresponding to the second failed count, wherein a second portion of functionality of the application is disabled at the second failsafe mode level, the second portion being greater than the first portion; and
   initializing the application at the second failsafe mode level, wherein initializing the application at the second failsafe mode level comprises launching the application with the second portion of the functionality of the application disabled.

7. A computer program product comprising a non-transitory storage medium readable by a processing circuit and storing instructions for execution by the processing circuit for performing a method to enable a multi-level failsafe capability of an electronic device a failsafe mode for an electronic device, the method comprising:
   determining a failed count indicative of a number of failed attempts to launch an application executing on the electronic device;
   selecting a failsafe mode level corresponding to the failed count;
   initializing the application at the failsafe mode level, wherein initializing the application at the failsafe mode level comprises launching the application with a portion of functionality of the application disabled, and
   setting the failed count to zero based on a determination that a predetermined time period has elapsed without the application failing.

8. The computer program product of claim 7, wherein selecting the failsafe mode level corresponding to the failed count comprises:
   determining that the failed count lies within a particular predetermined threshold range of failed attempts among a plurality of predetermined threshold ranges, wherein the plurality of predetermined threshold ranges correspond to a plurality of different failsafe mode levels, respectively;

determining that a failsafe mode level corresponds to the particular predetermined threshold range; and selecting the failsafe mode level among the plurality of failsafe mode levels based at least in part on determining that the failsafe mode level corresponds to the particular predetermined threshold range.

9. The computer program product of claim 7, the method further comprising during a live-debugging of the application:

receiving a user request to enable a portion of the disabled functionality; and enabling the portion of the disabled functionality.

10. The computer program product of claim 9, wherein the user request is a first user request, the method further comprising:

determining that the application has failed after the portion of the disabled functionality is enabled;

receiving a second user request to modify configuration settings associated with the portion of the disabled functionality;

modifying the configuration settings based at least in part on receiving the second user request; and re-initializing the application at the failsafe mode level.

11. The computer program product of claim 7, wherein the failed count is a first failed count, the failsafe mode level is a first failsafe mode level, and the portion of functionality is a first portion of functionality, the method further comprising:

determining a second failed count indicative of an updated number of failed attempts to launch the application;

selecting a second failsafe mode level corresponding to the second failed count, wherein a second portion of functionality of the application is disabled at the second failsafe mode level, the second portion being greater than the first portion; and initializing the application at the second failsafe mode level, wherein initializing the application at the second failsafe mode level comprises launching the application with the second portion of the functionality of the application disabled.

12. An electronic device having a multi-level failsafe capability, the electronic device comprising:

a processing unit in communication with one or more types of memory, the processing unit configured to:

determine a failed count indicative of a number of failed attempts to launch an application executing on the electronic device;

select a failsafe mode level corresponding to the failed count;

initialize the application at the failsafe mode level, wherein initializing the application at the failsafe mode level comprises launching the application with a portion of functionality of the application disabled, and set the failed count to zero based on a determination that a predetermined time period has elapsed without the application failing.

13. The electronic device of claim 12, wherein the processing unit is further configured to:

determine that the application has failed within a predetermined time period;

increment the failed count; and re-launch the application.

14. The electronic device of claim 12, wherein the processing unit is configured to select the failsafe mode level corresponding to the failed count by:

determining that the failed count lies within a particular predetermined threshold range of failed attempts among a plurality of predetermined threshold ranges, wherein the plurality of predetermined threshold ranges correspond to a plurality of different failsafe mode levels, respectively;

determining that a failsafe mode level corresponds to the particular predetermined threshold range; and selecting the failsafe mode level among the plurality of failsafe mode levels based at least in part on determining that the failsafe mode level corresponds to the particular predetermined threshold range.

15. The electronic device of claim 12, wherein the processing unit is further configured to during a live-debugging of the application:

receive a user request to enable a portion of the disabled functionality; and enable the portion of the disabled functionality.

16. The electronic device of claim 15, wherein the user request is a first user request, and wherein the processing unit is further configured to:

determine that the application has failed after the portion of the disabled functionality is enabled;

receive a second user request to modify configuration settings associated with the portion of the disabled functionality;

modify the configuration settings based at least in part on receiving the second user request; and re-initialize the application at the failsafe mode level.

17. The electronic device of claim 15, wherein the failed count is a first failed count, the failsafe mode level is a first failsafe mode level, and the portion of functionality is a first portion of functionality, and wherein the processing unit is further configured to:

determine a second failed count indicative of an updated number of failed attempts to launch the application;

select a second failsafe mode level corresponding to the second failed count, wherein a second portion of functionality of the application is disabled at the second failsafe mode level, the second portion being greater than the first portion; and initialize the application at the second failsafe mode level, wherein initializing the application at the second failsafe mode level comprises launching the application with the second portion of the functionality of the application disabled.

* * * * *